United States Patent Office 3,529,984
Patented Sept. 22, 1970

3,529,984
MIXTURES OF WATER-INSOLUBLE DISAZO DYESTUFFS AND PROCESS FOR PREPARING THEM
Wolfgang Bandel, Kelkheim, Taunus, and Joachim Ribka, Offenbach am Main, Germany, assignors to Farbwerke Hoechst Aktiengesellschaft vormals Meister Lucius & Bruning, Frankfurt am Main, Germany, a corporation of Germany
No Drawing. Filed Aug. 11, 1966, Ser. No. 571,703
Claims priority, application Germany, Aug. 14, 1965, F 46,907
Int. Cl. C08h 17/14
U.S. Cl. 106—288                     11 Claims

ABSTRACT OF THE DISCLOSURE

The present invention relates to mixtures of water-insoluble disazo-dyestuffs and to a process for preparing them; in particular it relates to new, water-insoluble disazo dyestuff mixtures consisting of one asymmetrical dyestuff each of the general formula

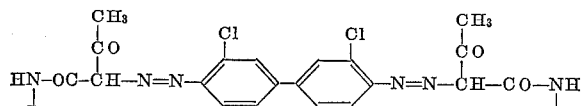

and two symmetrical dyestuffs of the general formulae

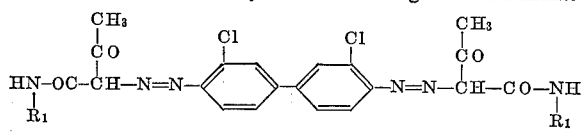

and

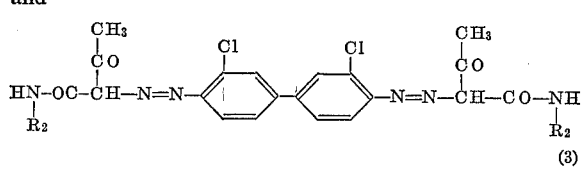

in which $R_1$ represents a phenyl radical which may be substituted by alkyl or alkoxy groups or by chlorine atoms, or a naphthyl radical, and $R_2$ represents an aromatic or heterocyclic radical which may be substituted by non-hydrosolubilizing groups, provided that if one coupling component is 1-acetoacetylamino-2-methoxybenzene, the other is neither 1-acetoacetylamino-2,4-dimethylbenzene nor 1-acetoacetyl-amino-2,5-dimethoxy-4-chlorobenzene.

---

It has now been found that water-insoluble disazo dyestuffs of similarly good properties are obtained by coupling 1 mol of tetrazotized 4,4'-diamino-3,3'-dichlorodiphenyl with 2 mols of a mixture of two different coupling components A and B corresponding to the general formulae

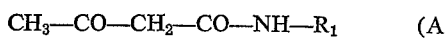
$$CH_3—CO—CH_2—CO—NH—R_1 \quad (A)$$
and
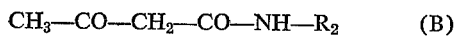
$$CH_3—CO—CH_2—CO—NH—R_2 \quad (B)$$

in which $R_1$ represents a phenyl radical which may be substituted by alkyl- or alkoxy groups or chlorine atoms, or a naphthyl radical, and $R_2$ represents an aromatic or heterocyclic ring which may be substituted by non-hydrosolubilizing groups, wherein the hydrosolubilizing carboxylic acid, and sulfonic acid groups are not used, provided that if one coupling component is 1-acetoacetylamino-2-methoxybenzene, the other is neither 1-acetoacetylamino-2,4-dimethylbenzene nor 1-acetoacetylamino-2,5-dimethoxy-4-chlorobenzene.

The dyestuffs may be prepared according to known methods by coupling the tetrazotized diamine with a mixture of both coupling components, for example, in an aqueous medium, suitably in the presence of a nonionic, anion-active or cation-active dispersing agent or in the presence of an organic solvent such as, for example, pyridine, quinoline or dimethyl-formamide. To improve the quality of the grain of the pigments obtained, it may be of advantage to heat, for example to boil the aqueous coupling mixture for some time, with a simultaneous addition of small amounts of an organic solvent, for example pyridine, chlorobenzene, a phthalic acid dialkyl ester or a resin soap.

The two coupling components may be admixed with one another in various ratios, depending on the properties of technical applicability of the pigment to be prepared. The coupling components may be mixed with one another for example, in the ratios of 1:1, 5:1, 10:1, or 20:1. The disazo dyestuff mixture obtained consists of one asymmetrical dyestuff of the Formula 1

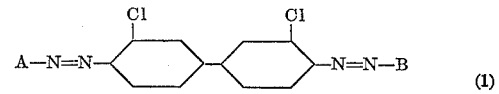

and two symmetrical dyestuffs of the formulae

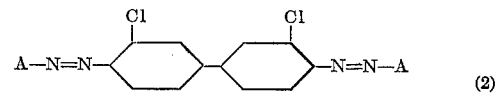

and

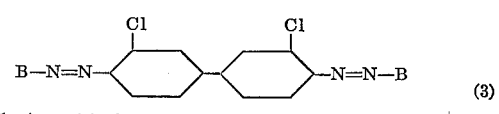

in which A and B have the above-mentioned Formulae A and B. The proportion of the various disazo dyestuffs of Formulae 1, 2 and 3 in the disazo dyestuff mixture depends on the ratio by weight of the two coupling components A and B as well as of the coupling conditions and of the coupling energy of both coupling components used. The proportion of the new asymmetrical disazo dyestuffs of Formula 1, hitherto unknown, may in particular be determined by means of a mass spectrometer.

As coupling component of Formula A may be used for example, 1-acetoacetylamino compounds of the following primary amines: aniline, isomeric compounds in various positions of aminomethylbenzene, aminoethylbenzene, aminomethoxybenzene, aminoethoxybenzene, aminochlorobenzene, amino-di- and trimethylbenzene, aminodimethoxybenzene, aminodichlorobenzene, aminomethylmethoxybenzene, aminomethylethoxybenzene, aminomethylchlorobenzene, aminomethoxychlorobenzene, aminoethoxychlorobenzene, aminodimethylmethoxybenzene, aminodimethylchlorobenzene, aminodimethoxymethylbenzene, aminodiethoxybenzene, aminodimethoxychlorobenzene, aminodiethoxychlorobenzene, aminodichloromethoxybenzene or aminonaphthalenes.

As coupling components of Formula B may be used, for example, the compounds which are mentioned as suitable for the coupling component of Formula A. Furthermore, 1-acetoacetylamino compounds of primary amines may be used which, in addition to the substituents mentioned as coupling components of Formula A may contain in the phenyl radical the following substituents: nitro groups, acetylamino-, benzoylamino, carboxylic acid amide, sulfonic acid amide, trifluormethyl and cyano groups. Furthermore, there can be applied as coupling components of Formula B 1-acetacetylamino compounds of primary heterocyclic amines which may be substituted by non-hydrosolubilizing groups, for example, pyridine, benzimidazol, benzimidazolone, benzotriazol, benzindazol; carbostyrile, benzothiazol, carbazol or diphenylenoxide.

The disazo dyestuffs obtained according to the invention are water-insoluble pigments which are distinguished by good fastness to light and to solvents. They are suitable for dyeing plastic masses, synthetic acid and natural resins, lacquers and lakeformers, for dyeing spinning masses as well as for dyeing and printing paper and textiles according to the known pigment printing and dyeing processes. Owing to their excellent properties of technical applicability the new dyestuffs are especially suitable for the manufacture of printing colours which are especially distinguished by a good rheological quality of the printing pastes and high tinctorial strength and transparency of the dyeings.

The following examples serve to illustrate the invention but they are not intended to limit it thereto, the parts being by weight unless otherwise stated.

EXAMPLE 1

9.9 parts of 1-acetoacetylamino-4-methylbenzene and 9.2 parts of 1-acetoacetylaminobenzene are dissolved at room temperature while stirring, in a mixture of 160 parts by volume of water and 25 parts by volume of a 5 N sodium hydroxide solution. This solution is added at 0°–5° C., within 30 minutes, while stirring to a solution of 170 parts by volume of water, 9 parts by volume of glacial acetic acid and 0.75 part of a reaction product of about 20 mols of ethylene oxide on 1 mol of octadecyl alcohol. There is obtained a fine suspension to which, at 15°–20° C. within one hour, the solution of tetrazotized 4,4'-diamino-3,3'-dichlorodiphenyl (prepared by stirring 12.65 parts of 4,4'-diamino-3,3'-dichlorodiphenyl with 61 parts by volume of 5 N hydrochloric acid and 175 parts by volume of water, by tetrazotizing with 20 parts by volume of a 5 N sodium nitrite solution and by clarifying the tetrazo solution by means of silica gel). In this process, the pH value of the coupling mixture is kept at about 4 to 4.5 by simultaneously adding a dilute aqueous sodium acetate solution.

When coupling is completed, the reaction mixture is combined with an aqueous solution of 5 parts of calcium chloride and an aqueous solution of 7 parts of resin soap. The whole is heated to 85° C., and kept at this temperature for 10 minutes and the dyestuff that has formed is separated by filtration with suction, washed and dried.

A pigment dyestuff is obtained, which, incorporated into a printing colour suitable for graphical purposes yields yellow dyeings of excellent tinctorial strength.

When 15 parts of 1-acetoacetylamino-4-methylbenzene and 4.6 parts of 1-acetoacetylaminobenzene are used and processing is carried out in the above-mentioned manner, a pigment dyestuff is obtained which, incorporated into a printing colour suitable for graphical purposes yields a more reddish yellow dyeing of the same excellent tinctorial strength. When 5 parts of 1-acetoacetylamino-4-methylbenzene and 13.8 parts of 1-acetoacetylaminobenzene are used and processing is carried out in the above-described manner, a pigment dyestuff is obtained which, incorporated into a printing colour suitable for graphical purposes yields a more greenish yellow dyeing of excellent tinctorial strength, too.

When using as a dispersing agent the same amount of dibutylnaphthalene sulfonic acid or oleyl amine acetate instead of 0.75 part of a reaction product of about 20 mols of ethylene oxide and 1 mol of octadecyl alcohol, a pigment dyestuff is obtained which, incorporated into a printing colour suitable for graphical purposes yields a more transparent yellow dyeing of excellent tinctorial strength, too.

EXAMPLE 2

24.9 parts of 1-acetoacetylamino-4-chloro-2-methoxybenzene and 18.3 parts of 1-acetoacetylaminobenzene are dissolved at room temperature in 500 parts by volume of water and 45 parts by volume of a 5 N sodium hydroxide solution. The clear solution is introduced at 3° C. within about 30 minutes into a mixture of 650 parts by volume of water and 15 parts by volume of glacial acetic acid. Then an aqueous solution of 55 parts of crystallized sodium acetate is added, and coupling is effected at room temperature within one hour with a solution of tetrazotized 4,4'-diamino-3,3'-dichlorodiphenyl (prepared by stirring 25.3 parts of 4,4'-diamino-3,3'-dichlorodiphenyl with 122 parts by volume of 5 N hydrochloric acid and 350 parts by volume of water, tetrazotizing with 40 parts by volume of a 5 N sodium nitrite solution and clarifying the tetrazotized solution by means of silica gel).

When coupling is completed, the mixture is heated to 90°–95° C. and kept at this temperature for 20 minutes and the dyestuff is filtered off with suction. It is washed and dried at 60° C.

A pigment dyestuff is obtained which, incorporated into a printing colour suitable for graphical purposes yields yellow dyeings of excellent tinctorial strength and transparency.

When processing is carried out in the above-described manner, but, after coupling being terminated, an aqueous emulsion of 3 parts of o-dichlorobenzene is added to the reaction mixture, then heated to 90°–95° C., kept at this temperature for 20 minutes, the dyestuff thus obtained is filtered off with suction and dried at 60° C., a pigment dyestuff is obtained which, compared to that described above, absorbs relatively little oil and which, incorporated into a printing colour suitable for graphical purposes yields dyeings of high tinctorial strength and good transparency.

EXAMPLE 3

30 parts of 1-acetoacetylamino-4-methylbenzene and 10.6 parts of 1-acetoacetylamino-2-methoxybenzene are dissolved at room temperature while stirring, in a mixture of 500 parts by volume of water and 46 parts by volume of a 5 N sodium hydroxide solution. An aqueous solution of 4 parts of a resin soap is added. Then, an aqueous solution of 50 parts of crystallized sodium acetate is added, and at about 15° C., an aqueous solution of 20 parts of glacial acetic acid is slowly added within 30 minutes. Within one hour at room temperature, coupling is carried out with a solution of tetrazotized 4,4'-diamino-3,3'-dichlorodiphenyl (preparation as described in Example 2).

When coupling is completed, the mixture is heated to about 85° C. and kept at this temperature for 30 minutes and the dyestuff is filtered off with suction. It is washed and dried at 60° C.

A pigment dyestuff is obtained, which incorporated into a printing colour suitable for graphical purposes yields a more medium yellow dyeing of excellent tinctorial strength and good transparency.

The following table contains a series of further coupling components A and B and their molar ratios as well as the tints of the printings obtained with dyestuffs which have been prepared from these components by using tetrazotized 4,4'-diamino-3,3'-dichlorodiphenyl as tetrazo components, and which may be prepared according to the corresponding indications in Examples 1 to 3.

| Coupling component A | Coupling component B | Molar ratio | Tint |
|---|---|---|---|
| 1-acetoacetylaminobenzene | 1-acetoacetylamino-2-methylbenzene | 1:1 | Medium yellow. |
| Do | do | 5:1 | Do. |
| Do | 1-acetoacetylamino-1-naphthylamine | 1:2 | Reddish yellow. |
| Do | 1-acetoacetylamino-2-methoxybenzene | 2:1 | Medium yellow. |
| Do | 1-acetoacetylamino-2,4-dimethylbenzene | 1:1 | Do. |
| Do | 1-acetoacetylamino-4-methylbenzene | 10:1 | Do. |
| Do | do | 19:1 | Do. |
| Do | 1-acetoacetylamino-2-chlorobenzene | 5:1 | Do. |
| Do | 1-(acetoacetylamino)-benzene-3-sulfonic acid amide. | 10:1 | Do. |
| Do | do | 18:1 | Do. |
| Do | 3-acetoacetylaminocarbazol | 15:1 | Do. |
| Do | 7-acetoacetylaminocarbostyril | 18:1 | Do. |
| Do | 1-acetoacetylamino-2,5-dimethoxy-4-benzoylaminobenzene. | 9:1 | Do. |
| 1-acetoacetylamino-4-methylbenzene | 1-acetoacetylamino-2-methoxy-4-chlorobenzene | 1:2 | Do. |
| Do | do | 3:1 | Reddish Do. |
| Do | 1-acetoacetylamino-2,5-dimethoxy-4-chlorobenzene. | 1:2 | Do. |
| Do | do | 3:1 | Do. |
| 1-acetoacetylamino-2-methylbenzene | 1-acetoacetylamino-4-nitrobenzene | 2:1 | Medium yellow. |
| Do | 1-acetoacetylamino-4-acetylaminobenzene | 1:1 | Reddish yellow. |
| Do | 1-acetoacetylamino-4-methylbenzene | 1:1 | Medium yellow. |
| 1-acetoacetylamino-3-methoxybenzene | 5-acetoacetylamino-benzimidazolon | 3:1 | Do. |
| 1-acetoacetylamino-2-methoxybenzene | 1-(acetoacetylamino)-benzene-4-carboxylic acid amide. | 15:1 | Do. |
| Do | 1-(acetoacetylamino)-2-methoxybenzene-5-carboxylic acid amide. | 20:1 | Do. |
| 1-acetoacetylamino-2-ethoxybenzene | 1-acetoacetylamino-2,4-dimethylbenzene | 1:1 | Do. |
| 1-acetoacetylamino-2,5-dimethoxybenzene | 1-acetoacetylamino-2,5-dimethoxy-4-cyanobenzene. | 3:1 | Yellow. |
| 1-acetoacetylamino-2-methoxy-4-chlorobenzene | 1-acetoacetylamino-2-ethoxybenzene | 1:2 | Medium yellow. |
| 1-acetoacetylamino-2-methoxy-5-chlorobenzene | 1-acetoacetylaminobenzene | 2:1 | Do. |
| 1-acetoacetylamino-2-methyl-4-chlorobenzene | do | 1:4 | Do. |
| 1-acetoacetylamino-2,4-dimethylbenzene | 1-acetoacetylamino-2-ethoxy-5-acetylaminobenzene. | 3:1 | Do. |
| 1-acetoacetylamino-2-chlorobenzene | 2-acetoacetylaminonaphthalene | 1:1 | Do. |
| 1-acetoacetylamino-naphthalene | 3-acetoacetylamino-pyridine | 9:1 | Do. |
| 1-acetoacetylamino-2,5-dimethoxy-4-dichlorobenzene. | 5-acetoacetylamino-benzimidazolon | 2:1 | Reddish yellow. |
| 1-acetoacetylamino-2,5-dimethoxy-4-chlorobenzene. | 1-acetoacetylamino-2-methoxy-4-chlorobenzene | 1:2 | Do. |
| Do | 6-acetoacetylamino-benzindazol | 4:1 | Do. |
| 1-acetoacetylamino-2-methyl-4-methoxybenzene | 1-acetoacetylaminobenzene | 1:5 | Medium yellow. |
| Do | 5-acetoacetylamino-benzimidazol | 5:1 | Do. |
| 1-acetoacetylamino-2-methyl-3-chlorobenzene | 1-acetoacetylaminobenzene | 1:7 | Do. |
| Do | 6-acetoacetylamino-benztriazol | 9:1 | Do. |
| 1-acetoacetylamino-2-ethoxy-4-chlorobenzene | 1-acetoacetylamino-2-methylbenzene | 1:1 | Do. |
| Do | 2-acetoacetylamino-6-ethoxybenzothiazol | 3:1 | Do. |
| 1-acetoacetylamino-3,4-dimethylbenzene | 1-acetoacetylamino-4-methylbenzene | 1:1 | Reddish yellow. |
| Do | 1-acetoacetylamino-2,5-dichlorobenzene | 9:1 | Medium yellow. |
| Do | 1-acetoacetylamino-2-chloro-5-trifluormethylbenzene. | 19:1 | Do. |

We claim:

1. A process for the preparation of mixtures of 3 water-insoluble disazo-dyestuffs consisting of one asymmetrical dyestuff of the formula (1)

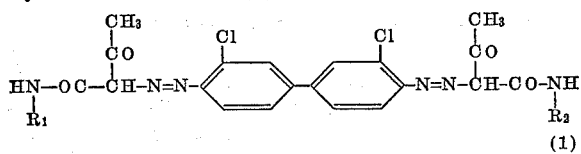

and two symmetrical dyestuffs of the formula

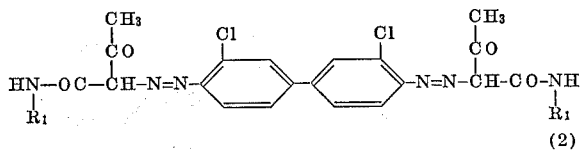

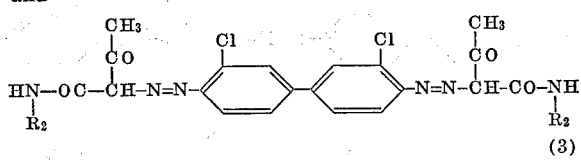

in which $R_1$ represents phenyl or phenyl substituted by lower alkyl groups, lower alkoxy groups or chlorine atoms, or a naphthyl group, and $R_2$ represents phenyl or phenyl substituted by lower alkyl, lower alkoxy, nitro, trifluoromethyl, cyano, sulfonamide, chlorine, carboxylic acid amide, acetylamino or benzoylamino groups, or a radical of naphthalene, carbazol, carbostyril, benzimidazol, benzimidazolon, pyridine, benzindazol, benztriazol, thiazol or ethoxybenzthiazol with the proviso that $R_1$ and $R_2$ in the above formulae being always different and with the exception that if $R_1$ is 2-methoxy-phenl, $R_2$ is neither 2,4-dimethyl-phenyl nor 2,5-dimethoxy-4-chloro-phenyl, which comprises coupling 1 mol of tetrazotized 4,4'-diamino-3,3'-dichlorodiphenyl with 2 mols of a mixture of two different coupling components A and B of the formula

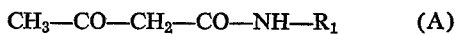

and

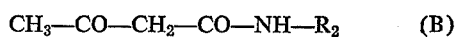

in which $R_1$ and $R_2$ are defined above, the molar ratio between the two coupling components being 1:1 to 1:20.

2. Mixtures of 3 water-insoluble disazo-dyestuffs consisting of one asymmetrical dyestuff of the Formula 1:

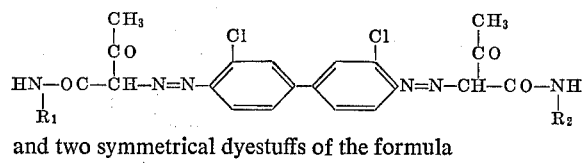

and two symmetrical dyestuffs of the formula

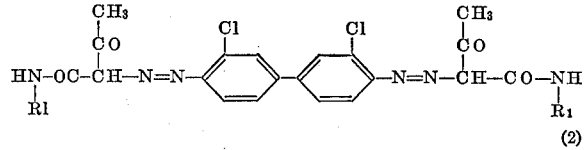

and

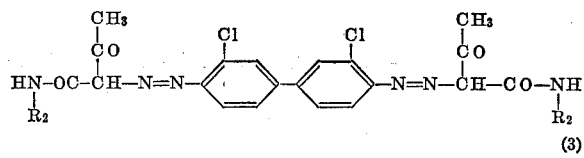

in which $R_1$ represents phenyl or phenyl substituted by lower alkyl groups, lower alkoxy groups or chlorine 3. A mixture of water-insoluble disazo-dyestuffs consisting of dyestuffs of the formula

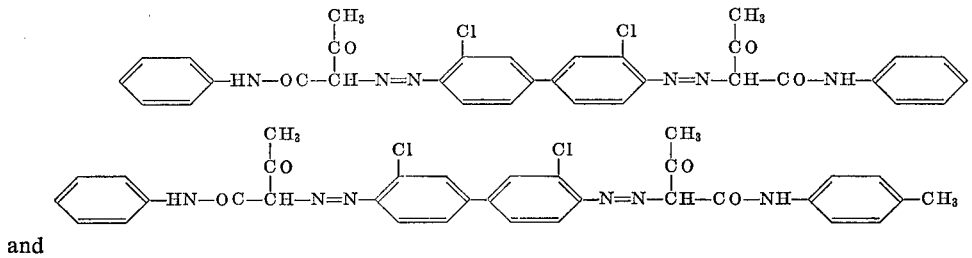

and

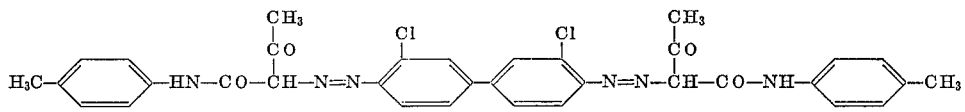

atoms, or a naphthyl group, and $R_2$ represents phenyl or phenyl substituted by lower alkyl, lower alkoxy, nitro, trifluoromethyl, cyano, sulfonamide, chlorine, carboxylic acid amide, acetylamino or benzoylamino groups, or a radical of naphthalene, carbazol, carbostyril, benzimidazol, benzimidazolon, pyridine, benzindazole, benztriazol, thiazol or ethoxy-benzthiazol with the proviso that $R_1$ obtained by coupling 1 mol tetrazotized 4,4'-diamino-3,3'-dichlorodiphenyl with 2 mols of a mixture consisting of 1-acetoacetylamino-benzene and 1-acetoacetylamino-4-methylbenzene, the molar ratio between the two coupling components being 1:1 to 1:20.

4. A mixture of water-insoluble disazo-dyestuffs consisting of dyestuffs of the formula

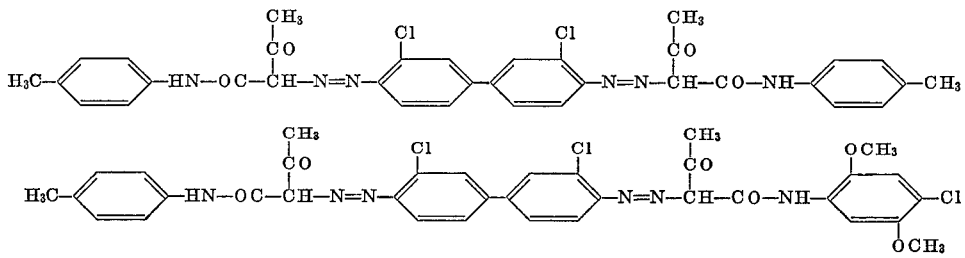

and

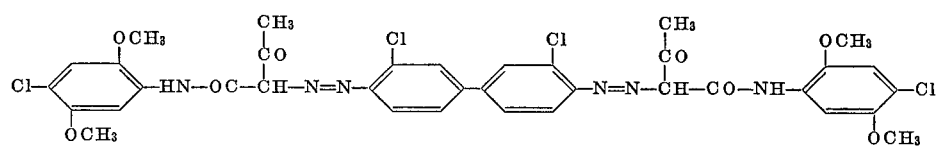

and $R_2$ in the above formulae being always different and with the exception that if $R_1$ is 2-methoxy-phenyl- $R_2$ is neither 2,4-dimethyl-phenyl nor 2,5-dimethoxy-4-chlorophenyl, obtained by coupling 1 mol of tetrazotized 4,4'-diamino-3,3'-dichlorodiphenyl with 2 mols of a mixture of two different coupling components A and B of the formula $$CH_3-CO-CH_2-CO-NH-R_1 \quad (A)$$

obtained by coupling 1 mol tetrazotized 4,4'-diamino-3,3'-dichlorodiphenyl with 2 mols of a mixture consisting of 1-acetoacetylamino-4-methylbenzene and 1-acetoacetylamino-2,5-dimethoxy-4-chloro-benzene, the molor ratio between the two coupling components being 1:1 to 1:20.

5. A mixture of water-insoluble disazo-dyestuffs consisting of dyestuffs of the formula

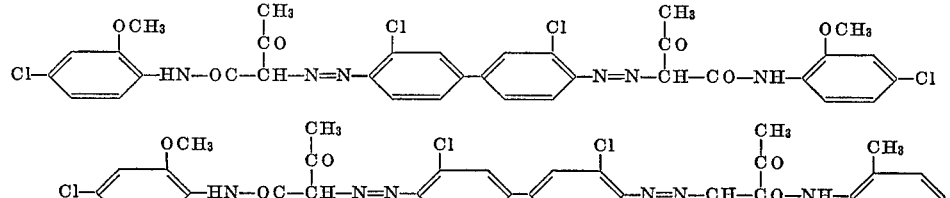

and

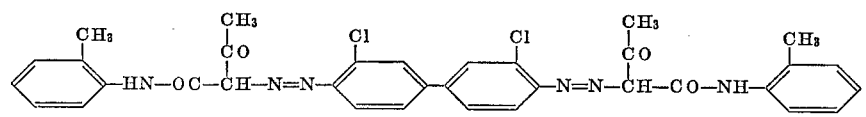

and $$CH_3-CO-CH_2-CO-NH-R_2 \quad (B)$$

in which $R_1$ and $R_2$ are defined above, the molar ratio between the two coupling components being 1:1 to 1:20.

obtained by coupling 1 mol tetrazotized 4,4'-diamino-3,3'-dichlorodiphenyl with 2 mols of a mixture consisting of 1-acetoacetylamino-2-methoxy-4-chlorbenzene and 1-acetoacetylamino-2-methylbenezene, the molor ratio between the two coupling components being 1:1 to 1:20.

6. A mixture of water-insoluble disazo-dyestuffs consisting of dyestuffs of the formula

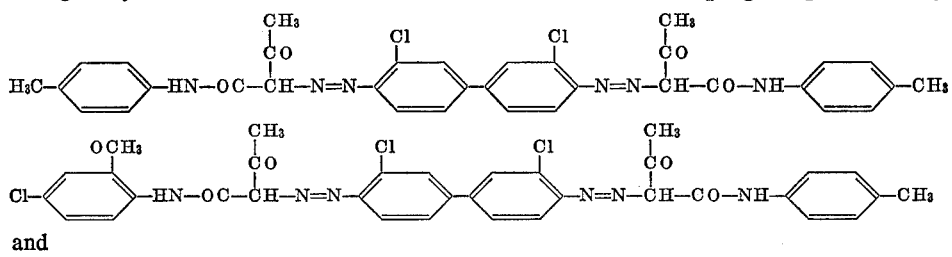

and

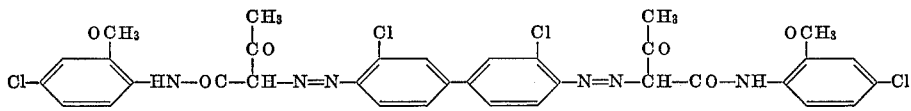

obtained by coupling 1 mol tetrazotized 4,4'-diamino-3,3'-dichlorodiphenyl with 2 mols of a mixture consisting of 1-acetoacetylamino-4-methylbenzene and 1-acetoacetylamino-2-methoxy-4-chloro-benzene, the molar ratio between the two coupling components being 1:1 to 1:20.

7. A mixture of water-insoluble disazo-dyestuffs consisting of dyestuffs of the formula

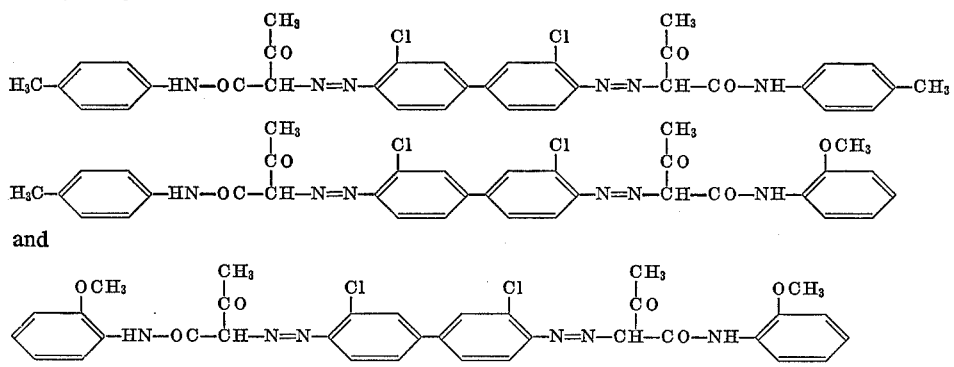

obtained by coupling 1 mol tetrazotized 4,4'-diamino-3,3'-dichlorodiphenyl with 2 mols of a mixture consisting of 1-acetoacetylamino-4-methyl-benzene and 1-acetoacetylamino-2-methoxy-benzene, the molar ratio between the two coupling components being 1:1 to 1:20.

8. A mixture of water-insoluble disazo-dyestuffs consisting of dyestuffs of the formula

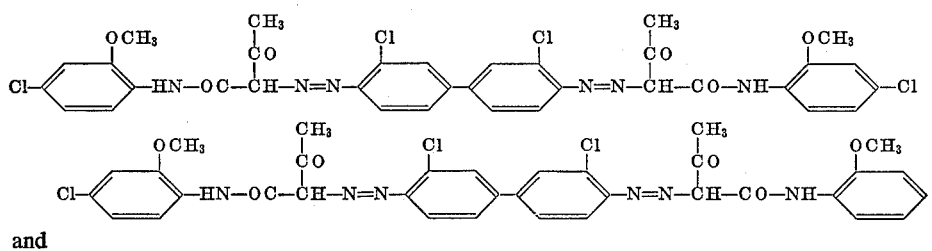

and

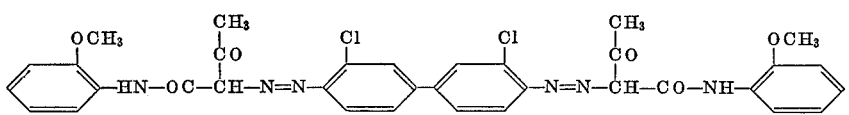

obtained by coupling 1 mol tetrazotized 4,4'-diamino-3,3'-dichlorodiphenyl with 2 mols of a mixture consisting of 1-acetoacetylamino-2-methoxy-4-chlorobenzene and 1-acetoacetylamino-2-methoxy-benzene, the molar ratio between the two coupling components being 1:1 to 1:20.

9. A mixture of water-insoluble disazo-dyestuffs consisting of dyestuffs of the formula

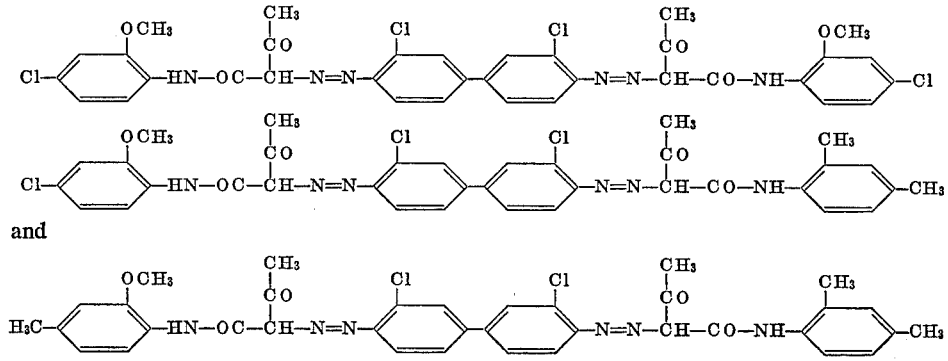

obtained by coupling 1 mol tetrazotized 4,4'-diamino-3,3'-dichlorodiphenyl with 2 mols of a mixture consisting of 1-acetoacetylamino-2-methoxy-4-chloro-benzene and 1-acetoacetylamino-2,5-dimethyl-benzene, the molar ratio between the two coupling components being 1:1 to 1:20.

10. A mixture of water-insoluble disazo-dyestuffs consisting of dyestuffs of the formula

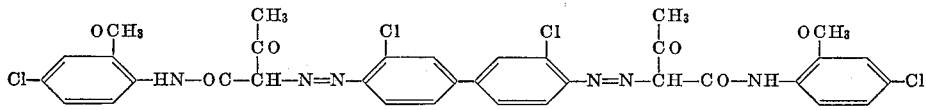

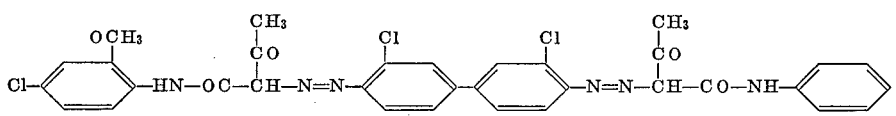

and

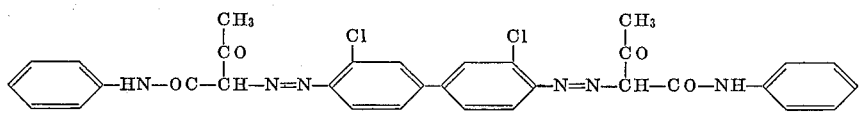

obtained by coupling 1 mol tetrazotized 4,4'-diamino-3,3'-dichlorodiphenyl with 2 mols of a mixture consisting of 1-acetoacetylamino-2-methoxy-4-chlorobenzene and 1-acetoacetylamino-benzene, the molar ratio between the two coupling components being 1:1 to 1:20.

11. A mixture of water-insoluble disazo-dyestuffs consisting of dyestuffs of the formula

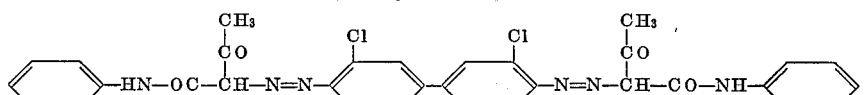

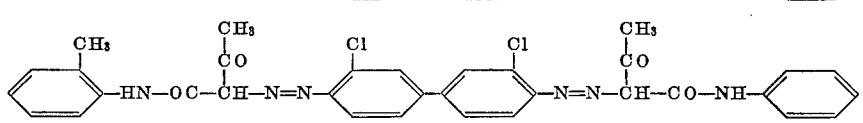

and

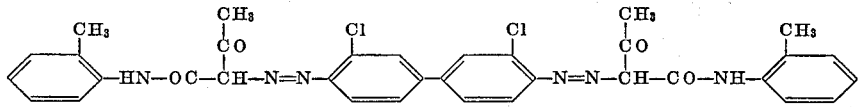

obtained by coupling 1 mol tetrazotized 4,4'-diamino-3,3'-dichlorodiphenyl with 2 mols of a mixture consisting of 1-acetoacetylamino-benzene and 1-acetoacetylamino-2-methyl-benzene, the molar ratio between the two coupling components being 1:1 to 1:20.

References Cited

UNITED STATES PATENTS 3,317,331   5/1967   Lenoir et al. _____ 106—288
3,446,640   5/1969   Orlova et al. _____ 106—288

OTHER REFERENCES

Lubs.: Chemistry of Synthetic Dyes and Pigments, Reinhold Pub. Corp., N.Y., 1955, p. 636.

JAMES E. POER, Primary Examiner